US009100650B2

(12) United States Patent
Kanou et al.

(10) Patent No.: US 9,100,650 B2
(45) Date of Patent: Aug. 4, 2015

(54) VIDEO ENCODING METHOD, DECODING METHOD, AND APPARATUS

(71) Applicants: Kazuyo Kanou, Yokohama (JP); Takeshi Chujoh, Kawasaki (JP); Goki Yasuda, Kawasaki (JP); Takashi Watanabe, Yokohama (JP)

(72) Inventors: Kazuyo Kanou, Yokohama (JP); Takeshi Chujoh, Kawasaki (JP); Goki Yasuda, Kawasaki (JP); Takashi Watanabe, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 456 days.

(21) Appl. No.: 13/627,198

(22) Filed: Sep. 26, 2012

(65) Prior Publication Data

US 2013/0022109 A1  Jan. 24, 2013

Related U.S. Application Data

(63) Continuation of application No. PCT/JP2010/055641, filed on Mar. 30, 2010.

(51) Int. Cl.
*H04N 19/167*  (2014.01)
*H04N 19/117*  (2014.01)
*H04N 19/136*  (2014.01)
*H04N 19/182*  (2014.01)
*H04N 19/82*  (2014.01)

(52) U.S. Cl.
CPC ........... *H04N 19/167* (2014.11); *H04N 19/117* (2014.11); *H04N 19/136* (2014.11); *H04N 19/182* (2014.11); *H04N 19/82* (2014.11)

(58) Field of Classification Search
CPC .................................................... H04N 19/167
See application file for complete search history.

(56) References Cited

U.S. PATENT DOCUMENTS

| 6,148,033 A | 11/2000 | Pearlstein et al. |
| 6,580,830 B1 | 6/2003 | Sato et al. |
| 2004/0213470 A1 | 10/2004 | Sato et al. |
| 2005/0152448 A1* | 7/2005 | Crinon et al. ............ 375/240.01 |
| 2006/0291563 A1* | 12/2006 | Park et al. ................ 375/240.17 |

(Continued)

FOREIGN PATENT DOCUMENTS

| JP | 2000-041258 A | 2/2000 |
| JP | 2000-041261 A | 2/2000 |

(Continued)

OTHER PUBLICATIONS

International Preliminary Report on Patentability Issued Dec. 13, 2012 in PCT/JP2010/055641 (English translation only).

(Continued)

*Primary Examiner* — Sath V Perungavoor
*Assistant Examiner* — James Pontius
(74) *Attorney, Agent, or Firm* — Oblon, McClelland, Maier & Neustadt, L.L.P.

(57) ABSTRACT

According to one embodiment, a method can generate an interpolation image signal including the integer-pixel and interpolation pixel values, based on, if the interpolation pixel is not located at the integer-pixel position and in a row of an integer-pixel, and the interpolation pixel is located at a first pixel position displaced from the integer-pixel in horizontal and vertical directions by a half pixel, applying a first filter, and if the interpolation pixel is located at a second pixel position displaced from the integer-pixel in the directions by a quarter pixel, applying a second filter, and if the interpolation pixel is not located at the first and second pixel positions, applying the second and first filters.

12 Claims, 5 Drawing Sheets

(56) References Cited

U.S. PATENT DOCUMENTS

| | | | |
|---|---|---|---|
| 2008/0175322 A1* | 7/2008 | Lee et al. | 375/240.16 |
| 2009/0087111 A1 | 4/2009 | Noda et al. | |
| 2010/0046851 A1* | 2/2010 | Inoue et al. | 382/260 |
| 2010/0098345 A1* | 4/2010 | Andersson et al. | 382/238 |
| 2013/0182763 A1* | 7/2013 | Yasuda et al. | 375/240.12 |
| 2013/0182780 A1* | 7/2013 | Alshin et al. | 375/240.29 |
| 2014/0133551 A1* | 5/2014 | Alshina et al. | 375/240.03 |
| 2015/0010082 A1* | 1/2015 | Iwata et al. | 375/240.16 |

FOREIGN PATENT DOCUMENTS

| | | |
|---|---|---|
| JP | 2003-333599 A | 11/2003 |
| JP | 2004-007337 A | 1/2004 |
| JP | 2006-340211 A | 12/2006 |
| JP | 2008-507190 | 3/2008 |
| JP | 2008-536414 A | 9/2008 |
| WO | WO 2006/006609 A1 | 1/2006 |
| WO | WO 2007/111292 A1 | 10/2007 |
| WO | WO 2007/114368 A1 | 10/2007 |
| WO | WO 2009/047917 A1 | 4/2009 |
| WO | WO 2009/126921 A1 | 10/2009 |

OTHER PUBLICATIONS

International Search Report issued on Jun. 8, 2010 for PCT/JP2010/055641 filed on Mar. 30, 2010 (with English translation).

ITU-T Q.6/SG16 Doc. C181, Geneva, Jan. 2009.

Japanese Office Action Issued Mar. 26, 2013 in Patent Application No. 2012-507943 (with English translation).

* cited by examiner

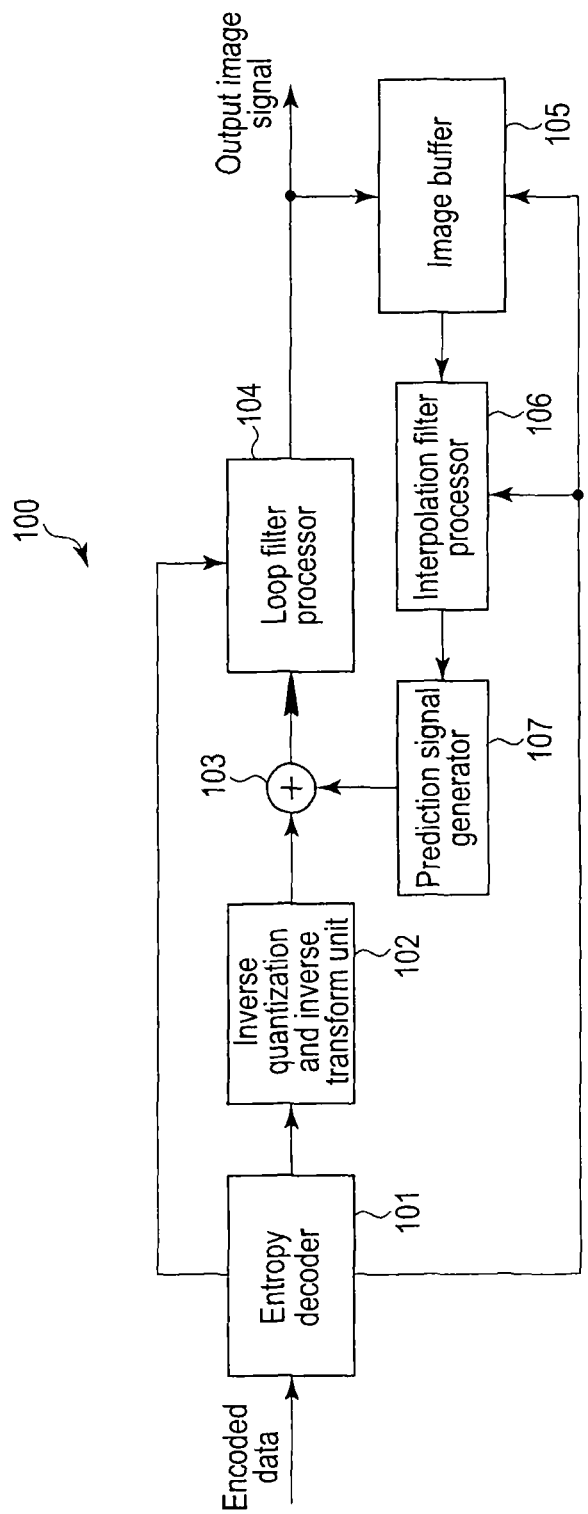
F I G. 1

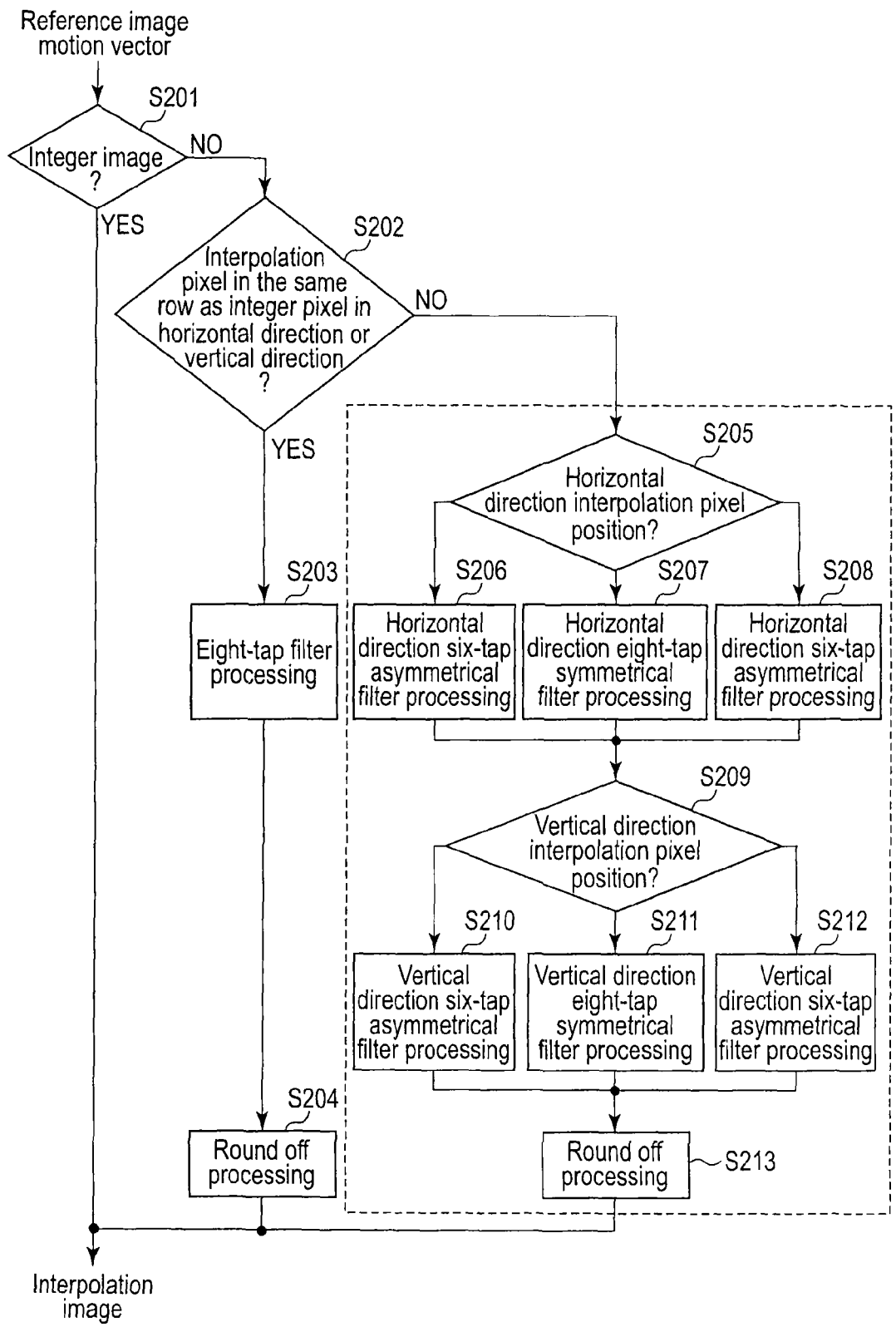
F I G. 2

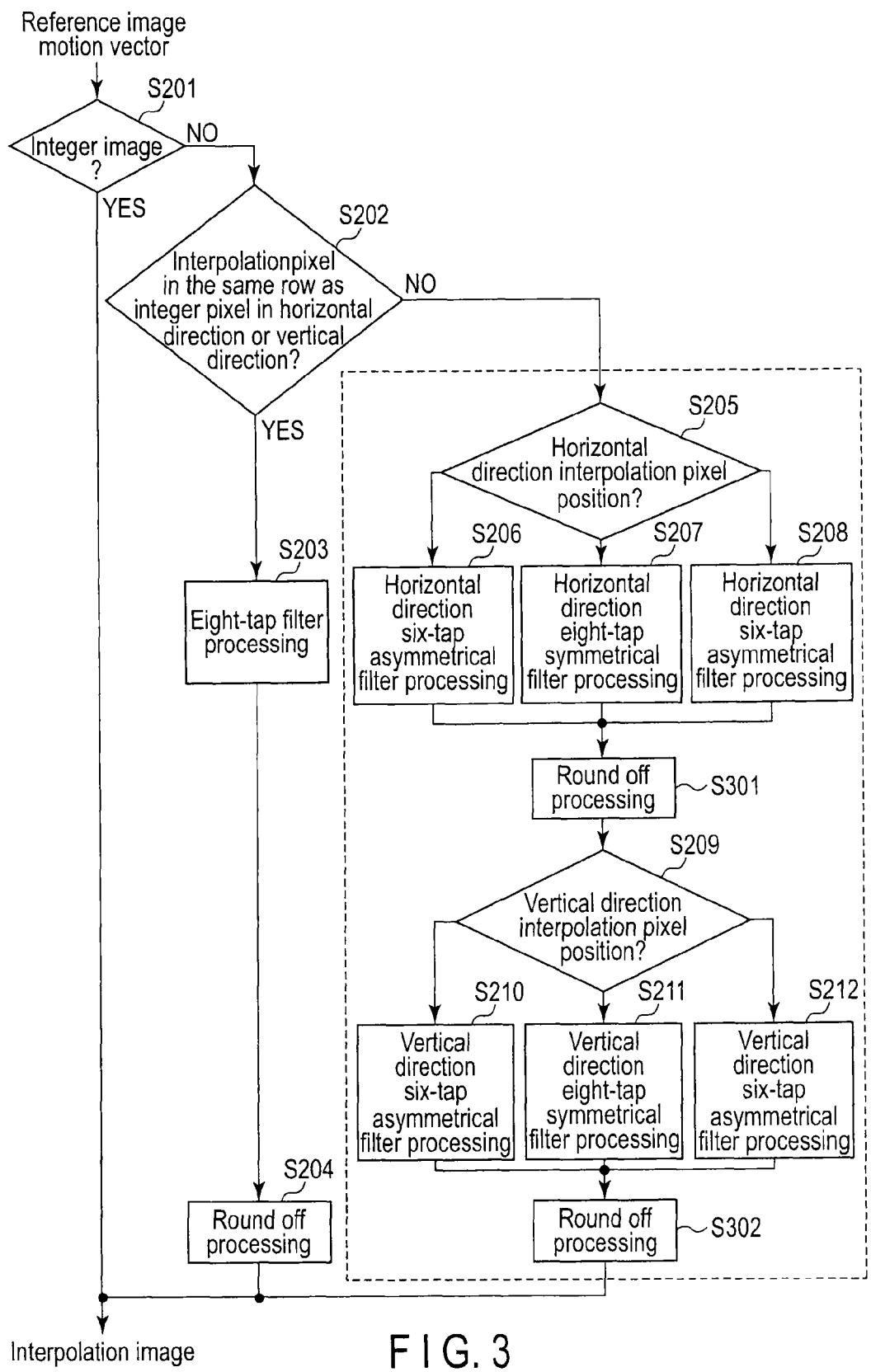
F I G. 3

VIDEO ENCODING METHOD, DECODING METHOD, AND APPARATUS

CROSS REFERENCE TO RELATED APPLICATIONS

This application is a Continuation application of PCT Application No. PCT/JP2010/055641, filed Mar. 30, 2010, the entire contents of which are incorporated herein by reference.

FIELD

Embodiments described herein relate generally to a video encoding method and decoding method, and apparatus.

BACKGROUND

There is an interpolation filter used in H.264/MPEG-4AVC (hereinafter referred to as H.264), i.e., one of international standard specifications of video encoding as an interpolation filter used for motion compensation of sub-pixel precision. In the H.264 interpolation filter, first, a pixel value of a half pixel is calculated, and a pixel value of a quarter pixel is calculated from an average of the calculated half pixels.

In addition, there is another interpolation filter, in which, first, a value calculated by applying a filter in a first direction is subjected to round off processing, whereby a reference value serving as a basis of a sub-pixel is calculated, and then, using the calculated reference value, a filter is applied in a second direction different from the first direction, and further, round off processing is performed to generate sub-pixels (See, e.g., Jpn. PCT National Publication No. 2008-507190).

Still further, there is an adaptive loop filter (ALF), i.e., another method for improving prediction efficiency by motion compensation. In the ALF, filter information including filter coefficients designed by an encoding side is sent to a decoding side, and the image quality is improved by using a common loop filter both in the encoding and decoding sides (See, e.g., T. Chujoh, N. Wada, G. Yasuda, "Quadtree-based Adaptive Loop Filter," ITU-T Q.6/SG16 Doc., C181, Geneva, January 2009).

BRIEF DESCRIPTION OF THE DRAWINGS

FIG. 1 is a block diagram illustrating a video decoding apparatus according to a first embodiment;

FIG. 2 is a flowchart illustrating operation of an interpolation filter processor;

FIG. 3 is a flowchart illustrating another example of operation of the interpolation filter processor;

DETAILED DESCRIPTION

Figure 4:
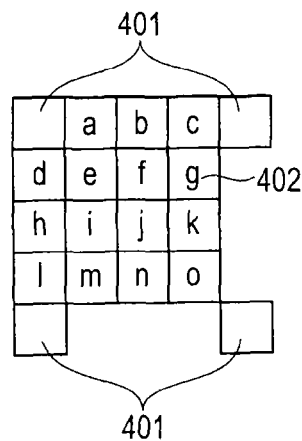
FIG. 4 is a figure illustrating an example of integer-pixels and sub-pixels.

When ALF and H.264 interpolation filter are used at the same time, the use of bilinear filter for calculating an average value using the generated half pixels excessively reduces high-frequency component of the interpolated reference image, and this reduces the prediction efficiency.

When the ALF and the interpolation filter described above are used at the same time, the prediction efficiency improves. On the other hand, when sub-pixels that are not in the same row as the integer-pixel in the horizontal direction and the vertical direction are interpolated, the maximum number of multiplications increases greatly. This is because at the positions of a quarter pixel and a three-quarter pixel, an asymmetrical filter is used in which a larger number of multiplications are performed than a symmetrical filter of the same tap length.

In general, according to one embodiment, a method for performing decoding processing with a less amount of operation is disclosed. The method can decode encoded data to obtain a loop filter information item for a decoded image signal which is to be decoded, a vector representing a position of interpolation pixel, and a reproduction differential signal. The method can perform filter processing on the decoded image signal based on the loop filter information item to generate a reference image signal including a pixel value of an integer-pixel. The method can generate an interpolation image signal including the pixel values of the integer-pixel and the interpolation pixel, based on, if the interpolation pixel obtained from the vector is not located at a integer-pixel position and is not located in a row of the integer-pixel in a horizontal direction or a vertical direction, and the interpolation pixel is located at a first pixel position displaced from the integer-pixel in the horizontal direction by a half pixel and displaced in the vertical direction by a half pixel, applying a first filter to the reference image signal in the vertical direction and the horizontal direction to obtain a pixel value of the interpolation pixel, the first filter being symmetrical, and if the interpolation pixel is located at a second pixel position displaced from the integer-pixel in the horizontal direction by a quarter pixel and displaced in the vertical direction by a quarter pixel, applying a second filter to the reference image signal in the horizontal direction and the vertical direction to obtain the pixel value of the interpolation pixel, the second filter being a asymmetrical filter that tap length is shorter than tap length of the first filter and if the interpolation pixel is not located at the first pixel position and the second pixel position, applying the second filter to the reference image signal in a first direction, in which the interpolation pixel is displaced by quarter pixel, and applying the first filter to the reference image signal in a second direction being is not the first direction, to obtain the pixel value of the interpolation pixel. The method can generate a prediction image signal based on the interpolation image signal. The method can obtain an output image signal from the prediction image signal and the reproduction differential signal.

Hereinafter, a video encoding method, decoding method, and apparatus according to embodiments will be explained in detail with reference to drawings. It should be noted that in the embodiments below, portions denoted with the same reference numerals are assumed to perform the same operations, and repeated explanation thereabout is omitted.

First Embodiment

A video decoding apparatus 100 according to the present embodiment includes an entropy decoder 101, an inverse quantization and inverse transform unit 102, an adder 103, a loop filter processor 104, an image buffer 105, an interpolation filter processor 106, and a prediction signal generator 107.

The entropy decoder 101 decodes encoded data transmitted from a video encoding apparatus, and obtains quantization transformation coefficient information, loop filter information, and amounts of displacements. The loop filter information is information for controlling filter processing and including filter coefficient information, and is generated in units of slices, for example. The filter coefficient information is information indicating filter coefficients used for integer-pixels in the filter processing. The amount of displacement (also referred to as vector quantity) represents a motion vector if it is between screens, and represents a displacement from a target pixel or block if it is within the same screen. Hereinafter, an example will be explained where the amount of displacement is a motion vector.

The inverse quantization and inverse transform unit 102 performs inverse quantization and thereafter inverse orthogonal transformation on the quantization transformation coefficient information decoded by the entropy decoder 101, and generates a reproduction differential signal. The reproduction differential signal is a signal indicating that a differential signal which reproduces by the decoding side. The differential signal representing a difference between a prediction image signal and an input image data (signal) generated by the video encoding apparatus.

The adder 103 respectively receives the reproduction differential signal from the inverse quantization and inverse transform unit 102 and the prediction image signal from the prediction signal generator 107 described later, and adds the reproduction differential signal and the prediction image signal, thus generating a decoded image signal.

The loop filter processor 104 respectively receives the decoded image signal from the adder 103 and the filter coefficient information from the entropy decoder 101. Then, the loop filter processor 104 performs filter processing on the decoded image signal in accordance with the filter coefficient information, thus generating a reference image signal. The loop filter processor 104 also outputs the reference image signal to the outside as an output image signal as necessary.

The image buffer 105 receives and accumulates the reference image signal generated by the loop filter processor 104.

The interpolation filter processor 106 respectively receives the amount of displacement from the entropy decoder 101, and the reference image signal from the image buffer 105. Then, the interpolation filter processor 106 looks up the amount of displacement and uses the integer-pixels of the reference image to calculate the interpolation pixels of sub-pixel precision, thereby generating an interpolation image signal. In the explanation below, generation of the interpolation pixel is explained as processing of a pixel value, but the pixel value may also be brightness value or color-difference signal value, and this may be applied regardless of color space. When the interpolation filter processing is performed within the same screen, the reference image signal from the image buffer 105 is an image signal already decoded within the same screen.

The prediction signal generator 107 receives the interpolation image signal from the interpolation filter processor 106, performs prediction processing such as motion compensation prediction using motion vectors, and generates a prediction image signal.

Subsequently, operation of the interpolation filter processor 106 will be explained in detail with reference to the flowchart of FIG. 2. In this case, the sub-pixel is explained using an example of a quarter pixel, but the sub-pixel is not limited to the quarter pixel. For example, sub-pixels such as one-eighth pixel, one-sixteenth pixel and the like can also be processed in the same manner.

In step S201, the interpolation filter processor 106 receives the reference image signal from the image buffer 105, and the motion vector from the entropy decoder 101, respectively. The interpolation filter processor 106 determines whether or not the interpolation pixel obtained from the motion vectors is an integer-pixel. When the interpolation pixel to be obtained is an integer-pixel, the interpolation processing is not performed, and the reference image is output as it is. When the interpolation pixel to be obtained is not an integer-pixel, i.e., it is a sub-pixel, step S202 is subsequently performed.

In step S202, the interpolation filter processor 106 determines whether or not the interpolation pixel is in a row of the integer-pixel in the horizontal direction or the vertical direction. When the position of the interpolation pixel is in a row of the integer-pixel in the horizontal direction or the vertical direction, step S203 is subsequently performed. When the position of the interpolation pixel is not in a row of the integer-pixel in the horizontal direction or the vertical direction, step S205 is subsequently performed.

In step S203, in order to calculate the interpolation pixel, the interpolation filter processor 106 applies eight-tap filters according to the position of the sub-pixel in the horizontal direction or the vertical direction. Expression (1) to expression (3) show eight-tap filters used at this occasion. It should be noted that the expression (1) is used to calculate the position of the quarter pixel, the expression (2) is used to calculate the position of the half pixel, and the expression (3) is used to calculate the position of the three-quarter pixel.

$$f1 = -3 \cdot X1 + 12 \cdot X2 - 37 \cdot X3 + 229 \cdot X4 + 71 \cdot X5 - 21 \cdot X6 + 6 \cdot X7 - 1 \cdot X8 \quad (1)$$

$$f2 = -3 \cdot X1 + 12 \cdot X2 - 39 \cdot X3 + 158 \cdot X4 + 158 \cdot X5 - 39 \cdot X6 + 12 \cdot X7 - 3 \cdot X8 \quad (2)$$

$$f3 = -1 \cdot X1 + 6 \cdot X2 - 21 \cdot X3 + 71 \cdot X4 + 229 \cdot X5 - 37 \cdot X6 + 12 \cdot X7 - 3 \cdot X8 \quad (3)$$

In each expression, X1 to X8 indicate pixel values of integer-pixels, and "·" indicates multiplication. It should be noted that the expression (1) and the expression (3) are asymmetrical filters that do not have any symmetric property, and the expression (2) is a symmetric filter having symmetric property in the filter coefficients.

In step S204, the interpolation filter processor 106 performs a round off processing using the expression (4) on the values calculated in step S203.

$$f = \text{Clip}(0, X, (fa + 128) >> 8) \quad (4)$$

In the expression (4), "f" indicates a value subjected to round off processing, "fa" indicates a value calculated using any one of the expression (1) to the expression (3), and X indicates a maximum value that can be represented using a pixel bit length of the input image. Further, ">>8" indicates right arithmetic shift operation of 8 bits, which is equivalent to division by $2^8$ and discarding the remainder. Clip (a,b,c) indicates clipping processing for putting c within a range between a and b as shown in the expression (5).

$$\text{Clip}(a, b, c) = \begin{cases} a; & c < a \\ b; & c > b \\ c; & a \le c \le b \end{cases} \quad (5)$$

In step S205, the interpolation filter processor 106 performs a determination according to the position of the interpolation pixel in the horizontal direction. When the interpolation pixel is located at a position away from the position of the integer-pixel by the quarter pixel in the horizontal direction, step S206 is subsequently performed. When the interpolation pixel is located at a position away from the integer-pixel by the half pixel in the horizontal direction, step S207 is subsequently performed. When the interpolation pixel is located at a position away from the integer-pixel by the three-quarter pixel in the horizontal direction, step S208 is subsequently performed.

In step S206, the interpolation filter processor 106 applies a six-tap asymmetrical filter to the interpolation pixel located at the position away from the integer-pixel by the quarter pixel using the expression (6) in the horizontal direction, so that the filter processing is performed.

$$f4 = 8 \cdot H1 - 34 \cdot H2 + 228 \cdot H3 + 69 \cdot H4 - 17 \cdot H5 + 2 \cdot H6 \qquad (6)$$

In the expression (6), H1 to H6 indicate pixel values of the integer-pixels.

In step S207, the interpolation filter processor 106 applies the eight-tap symmetrical filter to the interpolation pixel located at the position away from the integer-pixel by the half pixel in the horizontal direction. In this case, the same symmetrical filter as that of the expression (2) may be used.

In step S208, the interpolation filter processor 106 applies a six-tap asymmetrical filter to the interpolation pixel located at the position away from the integer-pixel by the three-quarter pixel using the expression (7) in the horizontal direction, so that the filter processing is performed.

$$f5 = 2 \cdot H1 - 17 \cdot H2 + 69 \cdot H3 + 228 \cdot H4 - 34 \cdot H5 + 8 \cdot H6 \qquad (7)$$

In step S209, the interpolation filter processor 106 performs a determination according to the position in the interpolation pixel of the vertical direction. When the interpolation pixel is located at a position away from the integer-pixel by the quarter pixel in the vertical direction, step S210 is subsequently performed. When the interpolation pixel is located at a position away from the integer-pixel by the half pixel in the vertical direction, step S210 is subsequently performed. When the interpolation pixel is located at a position away from the integer-pixel by the three-quarter pixel in the vertical direction, step S212 is subsequently performed.

In step S210, the interpolation filter processor 106 applies the six-tap asymmetrical filter to the interpolation pixel located at the position away from the integer-pixel by the quarter pixel in the vertical direction using the expression (6) like step S206, so that the filter processing is performed. It should be noted that, instead of the integer-pixels in the expression (6), pixel values of sub-pixels calculated in either of steps S206 to S208 are used.

In step S211, the interpolation filter processor 106 applies the eight-tap symmetrical filter to the interpolation pixel located at the position away from the integer-pixel by the half pixel in the vertical direction, so that the filter processing is performed. In this case, the same symmetrical filter as that of the expression (2) may be used. It should be noted that, instead of the integer-pixels in the expression (2), pixel values of sub-pixels calculated in either of steps S206 to S208 are used.

In step S212, the interpolation filter processor 106 applies the six-tap asymmetrical filter to the interpolation pixel located at the position away from the integer-pixel by the three-quarter pixel in the vertical direction using the expression (7) like step S208, so that the filter processing is performed. It should be noted that, instead of the integer-pixels in the expression (7), pixel values of sub-pixels calculated in either of steps S206 to S208 are used.

In step S213, the interpolation filter processor 106 performs a round off processing on the sub-pixel value calculated by applying two stages of filters in the horizontal direction and the vertical direction, using the expression (8).

$$f = \text{Clip}(0, X, (fb + 32768) >> 16) \qquad (8)$$

In the expression (8), "fb" indicates the value obtained by applying two times of filters in the horizontal direction and the vertical direction. The operation of the interpolation filter processor 106 is finished hereinabove. By applying this interpolation filter processing to each sub-pixel, the interpolation image signal of the sub-pixel precision obtained by calculating the sub-pixels within the block to be subjected to the interpolation filter processing can be generated.

As described above, the tap length of the asymmetrical filter is changed according to the position of the sub-pixel, and in rows other than rows of integer-pixels greatly affecting generation of the prediction image, the asymmetrical filter of which tap length is short is applied to the sub-pixels requiring relatively large number of operations, so that the amount of operation can be reduced.

In this case, another example of operation of the interpolation filter processor 106 will be explained with reference to the flowchart of FIG. 3.

The operation as shown in FIG. 3 is substantially the same as the operation of FIG. 2 except that step S301 is added, and therefore, explanation about other steps is omitted here.

In step S301, using the expression (4), the interpolation filter processor 106 performs the round off processing on the interpolation pixel calculated with the filter in the horizontal direction after processing of either of step S206 to step S208 is finished.

In step S302, using the value subjected to the round off processing in step S301 as an input value, the interpolation filter processor 106 performs the round off processing on the interpolation pixel calculated with the filter in the vertical direction.

As described above, every time the filter processing in one direction is finished, the round off processing is performed. Therefore, as compared with performing round off processing at a time after the filter processing in the horizontal direction and the vertical direction is finished, it is not necessary to assume the amount of useless processing, whereby the size of the circuit of the multiplier can be reduced.

In this case, in the calculation method for calculating interpolation pixels that are not on rows of the integer-pixel in the horizontal direction or the vertical direction, the interpolation filter processing is performed in the vertical direction after the interpolation filter processing is performed in the horizontal direction. Alternatively, the interpolation filter processing may be performed in the horizontal direction after the interpolation filter processing is performed in the vertical direction. Further, the tap length of the asymmetrical filter used to generate interpolation pixels in the row of the integer-pixel in the horizontal direction or the vertical direction does not affect the worst number of multiplications, and therefore, it may not be shorter than the tap length of the symmetrical filter. In other words, the tap length of the asymmetrical filter used to generate interpolation pixels that are not in the row of the integer-pixel in the horizontal direction or the vertical direction is shorter than the tap length of the asymmetrical filter used to generate interpolation pixels in the row of the integer-pixel in the horizontal direction or the vertical direction.

Further, the eight-tap filter is used as the symmetrical filter and the six-tap filter is used as the asymmetrical filter for the pixels that are not in the row of the integer-pixel in the horizontal direction or the vertical direction, but the tap length of the symmetrical filter may be shorter than the tap length of the asymmetrical filter. In other words, any combination may be used as long as the tap length of the symmetrical filter is less than the tap length of the asymmetrical filter, e.g., the twelve-tap filter may be used as the symmetrical filter, and the six-tap filter may be used as the asymmetrical filter.

In the present embodiment, eight-tap filter coefficients as shown in the expression (1) to the expression (3) and the filter coefficients of the taps as shown in the expression (6) and the expression (7) are used, but the filter coefficients are not limited thereto. Alternatively, other eight-tap and six-tap filter coefficients may be used.

Further, when, in the interpolation filter processing of the interpolation pixels that are not in the rows of the integer-pixel in the horizontal direction or the vertical direction, round off processing is performed between the filter processing in the horizontal direction and the filter processing in the vertical direction, the symmetrical filter can perform calculation by combining the coefficients, thus reducing the number of multiplications. Therefore, by performing the interpolation processing using the symmetrical filter before the interpolation processing using the asymmetrical filter, the overall number of multiplications can be reduced.

In this case, examples of interpolation pixels calculated by the interpolation filter processor 106 will be explained with reference to FIG. 4.

FIG. 4 shows four integer-pixels 401 and fifteen sub-pixels 402 ("a" to "o"). Among the four integer-pixels 401, the integer-pixel 401 at the upper left is adopted as a reference (hereinafter referred to as a reference integer-pixel), and the sub-pixels 402 are calculated.

More specifically, the sub-pixels "a", "b", "c" are arranged in the same row as the reference integer-pixel 401 in the horizontal direction, and therefore, the eight-tap filter processing as shown in the expression (1) is performed on the sub-pixel "a", the eight-tap filter processing as shown in the expression (2) is performed on the sub-pixel "b", and the eight-tap filter processing as shown in the expression (3) is performed on the sub-pixel "c", so that the pixel values of the sub-pixels are calculated. Likewise, the sub-pixels "d", "h", "l" are arranged in the same row as the reference integer-pixel 401 in the vertical direction, and therefore, the eight-tap filter processing as shown in the expression (1) is performed on the sub-pixel "d", the eight-tap filter processing as shown in the expression (2) is performed on the sub-pixel "h", and the eight-tap filter processing as shown in the expression (3) is performed on the sub-pixel "l", so that the pixel values of the sub-pixels are calculated.

Two stages of filter processings as described above are performed on the remaining sub-pixels "e", "f", "g", "i", "j", "k", "m", "n" and "o", and the pixel values of the sub-pixels are calculated. For example, when the pixel value of the sub-pixel "e" is calculated, first, it is displaced from the reference integer-pixel 401 by the quarter pixel in the horizontal direction, and therefore, processing of step S206 in FIG. 2 is performed, and the six-tap asymmetrical filter processing as shown in the expression (6) is performed. Subsequently, since it is displaced from the reference integer-pixel 401 by the quarter pixel in the vertical direction, the value calculated by the filter processing in the horizontal direction may be used as input, and the six-tap asymmetrical filter processing as shown in the expression (6) of step S210 may be performed. Likewise, when a sub-pixel "n" is calculated, it is displaced from the reference integer-pixel 401 in the horizontal direction by the half pixel, and therefore, the eight-tap symmetrical filter processing as shown in step S207 is performed. Subsequently, since it is displaced from the reference integer-pixel 401 in the vertical direction by the three-quarter pixel, the value calculated by the filter processing in the horizontal direction may be used as input, and the six-tap asymmetrical filter processing as shown in the expression (7) of step S212 may be performed.

Subsequently, processing method will be hereinafter explained in detail with reference to FIGS. 5 and 6 in a case where pixel values outside of the screen are required in the interpolation filter processing performed by the interpolation filter processor 106 according to the first embodiment.

Figure 5:
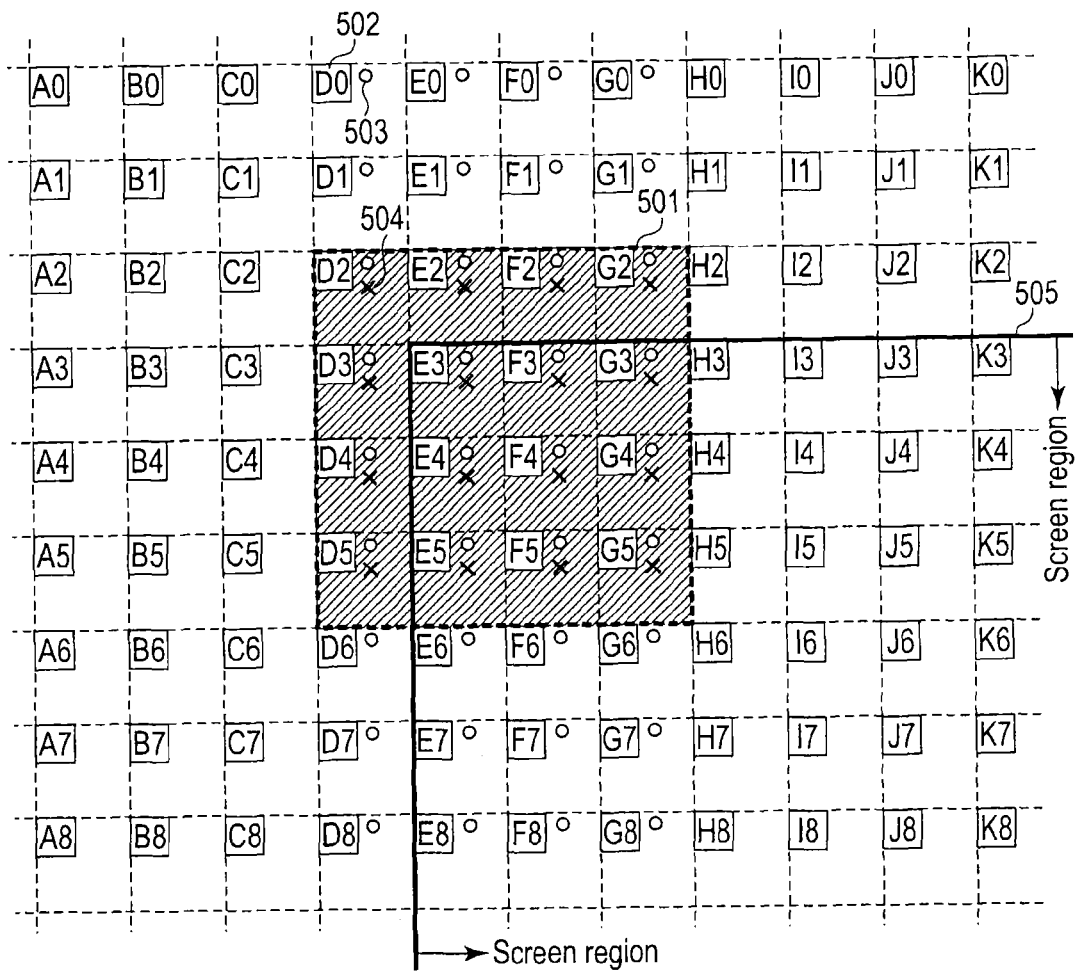
FIG. 5 is a figure illustrating an example where a target region to be subjected to interpolation filter processing is outside of a screen region.

FIG. 5 shows integer-pixels 502 and sub-pixels 503 required to calculate sub-pixels in 4×4 pixel block (processing target region 501 enclosed by a broken line), wherein the integer-pixels 502 are denoted as A0 to R8, B0 to B8, . . . , and K0 to K8, and the sub-pixels 503 are denoted as "O", and the sub-pixels 504 are denoted as "x". It is assumed that a thick line is a screen border 505, and the sub-pixels 504 are located at the position of the sub-pixel "f" in FIG. 4.

The sub-pixel "f" is located at a position displaced from the reference integer-pixel in the horizontal direction by the half pixel, and displaced in the vertical direction by the quarter pixel, and therefore, in the present embodiment, the interpolation processing is performed using the eight-tap symmetrical filter in the horizontal direction, and thereafter, the interpolation processing is performed using the six-tap asymmetrical filter in the vertical direction.

When the sub-pixels in the processing target region 501 are calculated, the sub-pixels 503, i.e., 36 half pixels, as shown in FIG. 5 are required to obtain the ultimate sub-pixels 504 by performing the second stage interpolation filter processing in the vertical direction, for example. In order to generate these sub-pixels 503, it is necessary to look up 99 integer-pixels 502 from A0 to K8 in the first stage interpolation filter processing in the horizontal direction. In this case, the integer-pixels 502 such as integer-pixels C2 and D2 located outside of the screen border 505 is a region where there is originally no pixel value, and therefore, the interpolation filter processing is performed after the pixel values of the integer-pixels inside of the screen border 505 are copied. As described above, in accordance with the pixel pointed by the motion vector, the pixel values within the screen are copied, and portions where there is no pixel value are interpolated.

Another method for calculating the pixel values outside of the screen may be used. In this method, the interpolation filter processing is performed only on the region inside of the screen border 505, and the interpolation pixels calculated in the region inside of the screen border 505 are copied to the other regions. More specifically, in the processing target region 501, the interpolation filter processing is performed only on the sub-pixels 504 calculated using nine pixels, i.e., E3 to E5, F3 to F5, and G3 to G5, as reference integer-pixels, but the interpolation filter processing is not performed on integer-pixel D2 to D5, E2, F2, G2 located outside of the screen border 505, and the pixel values of the interpolation pixels within the screen adjacent thereto are copied. By doing so, it is not necessary to use the integer-pixels A0 to A8, B0 to K0 for the filter processing, and the amount of operation can be reduced, and further, the amount of memory can also be reduced. However, it should be noted that the pixel values of the interpolation pixels outside of the screen border 505 do not match with the case where the interpolation processing is performed using the integer-pixels A0 to K8 according to the method as explained above.

An example of padding processing performed on a region outside of the screen will be explained in detail with reference to FIG. 6.

The padding processing according to the present embodiment means copying pixel values in a region within the screen as pixel values in a region outside of the screen. In FIG. 6, padding processing is performed on a sufficiently large region 601 including a screen region 602 having a height V and a width H. First, pixel values in a row of pixels at the right end of the screen region 602 are copied to the region 603 at the right of the screen. Likewise, pixel values in a row of pixels at the left end of the screen region 602 are copied to the region 604 at the left of the screen, pixel values in a row of pixels at the upper end of the screen region 602 are copied to the region 605 above the screen, and pixel values in a row of pixels at the lower end of the screen region 602 are copied to the region 606 below the screen. Pixel values at the four corners in the screen region 602 are respectively copied to the regions 607, 608, 609, 610 at the four corners of the region 601. By performing the padding processing in this manner, the interpolation filter processor 106 appropriately perform the interpolation filter processing even when pixels outside of the screen are needed.

Regarding the order of the padding processing, the padding processing may be performed after the interpolation filter processing, or between the processings. The number of times the padding processing is performed is not limited to once. For example, the filter processing may be performed in the horizontal direction, and thereafter, the padding processing may be performed, and further, the filter processing may be performed in the vertical direction, and thereafter, the padding processing may be performed again.

Figure 6:
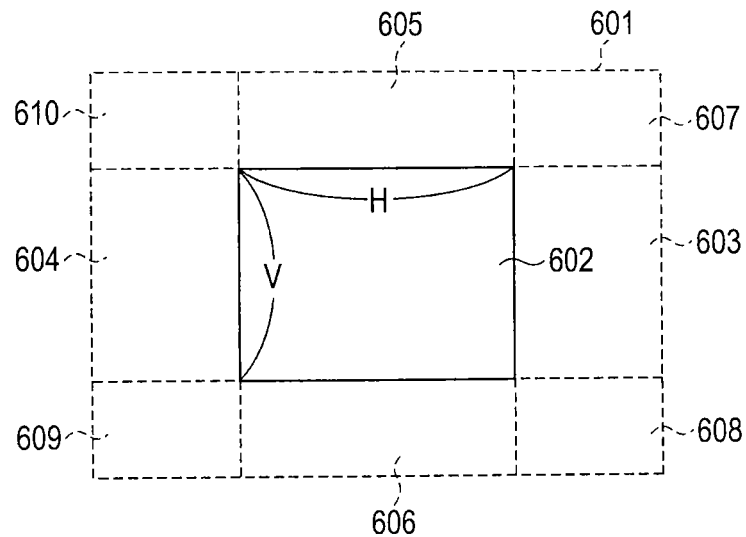
FIG. 6 is a figure illustrating an example of padding processing in the interpolation filter processor.

The region to which the pixel values are copied in the padding processing are necessarily adjacent to the screen region 602 as shown in FIG. 6, and a region storing pixel values of interpolation pixels generated by the interpolation filter processing may exist between the screen region and the region subjected to the padding processing. In this case, like the integer-pixels, pixel values of interpolation pixels may be copied to the region to which the padding processing is performed. Further, without copying the pixel values, pixel values at appropriate positions may be directly used according to a conditional determination. By doing so, it is not necessary to prepare a memory for storing pixels outside of the screen, and it is possible to achieve the processing equivalent to the case where pixel values are copied while reducing the memory.

In the round off processing performed by the interpolation filter processor 106, the expression (4) and the expression (8) are used. But the round off processing is not limited thereto, and it may be right arithmetic shift operation in accordance with a format of embodiment. For example, it is assumed that the round off processing is achieved as shown in the expression (9).

$$f = \text{Clip}(0, X, (V+U) >> R) \quad (9)$$

In the expression (9), X indicates the maximum value that can be represented with the bit length of the pixel given to the interpolation filter processor 106, V indicates a value with which the round off processing is performed, U indicates a value added to round off a value, and R indicates the number of bits with which the right arithmetic shift operation is performed. Where the total number of filter coefficients of the used filter is $2^N$, the number of bits R with which the right arithmetic shift operation is performed is N, and the value U added to round off the value is $2^{N-1}$. However, when the filter processing is performed in two stages in the horizontal direction and the vertical direction, R may be a value $N_S$, less than N, in the round off processing performed after the filter processing in the first stage. In this case, where the total number of filter coefficients used for the filter processing in the first stage is $2^A$, the total number of filter coefficients used for the filter processing in the second stage is $2^B$, and the maximum value that can be represented with the bit length of the pixel given to the interpolation filter processor 106 is $2^{M-1}$, then U is $2^{N_S-1}$ and X is $2^{M+(A-N_S)}-1$. Accordingly, also in the round off processing performed after the filter processing in the second stage, R is $(A+B-N_S)$, U is $2^{(A+B)-N_S-1}$, and X is $2^{M-1}$. When R is set less than N, the precision of operation in the filter processing can be enhanced. In the round off processing in two stages in the horizontal direction and the vertical direction without any round off processing provided therein, R is $(A+B)$, and U is $2^{(A+B-1)}$. The round off processing explained above is equivalent to dividing the value by $2^R$ and rounding off the quotient to integer, but alternatively, it is possible to drop the fractional portion of the quotient.

According to the first embodiment described above, when the interpolation pixels that are not in the row of the integer-pixel in the horizontal direction or the vertical direction are generated, the number of times of multiplication can be reduced by making the tap length of the used asymmetrical filter less than the tap length of the symmetrical filter, so that the decoding processing can be performed with a less amount of operation in whole.

Second Embodiment

Figure 7:
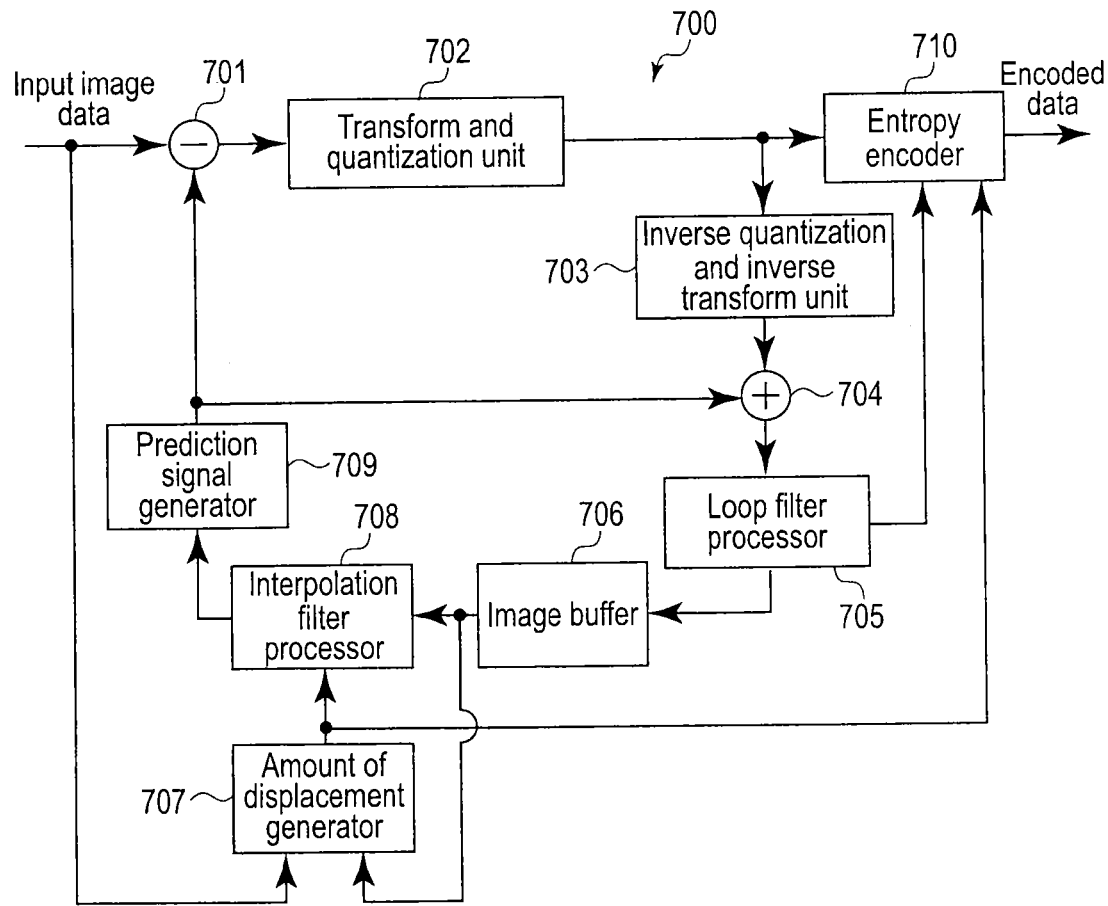
FIG. 7 is a block diagram illustrating a video encoding apparatus according to a second embodiment.

A video encoding apparatus corresponding to the video decoding apparatus according to the first embodiment will be explained in detail with reference to FIG. 7.

A video encoding apparatus 700 according to the second embodiment includes a subtractor 701, a transform and quantization unit 702, an inverse quantization and inverse transform unit 703, an adder 704, a loop filter processor 705, an image buffer 706, a displacement amount generator 707, an interpolation filter processor 708, a prediction signal generator 709, and an entropy encoder 710.

It should be noted that the inverse quantization and inverse transform unit 703, the image buffer 706, the interpolation filter processor 708, and the prediction signal generator 709 respectively perform the same operations as those of the inverse quantization and inverse transform unit 102, the image buffer 105, the interpolation filter processor 106, and the prediction signal generator 107 according to the first embodiment, and therefore, detailed description thereabout is omitted.

The subtractor 701 receives an input image data (signal) from the outside and receives a prediction image signal from the prediction signal generator 709 explained later, and outputs difference, as a differential signal, difference between the input image data and the prediction image signal.

The transform and quantization unit 702 receives the differential signal from the subtracting unit 701, converts and quantizes the differential signal, and generates quantization transformation coefficient information.

The adder 704 performs the same operation as the adder 103 according to the first embodiment. More specifically, the adder 704 respectively receives the reproduction differential signal from the inverse quantization and inverse transform unit 703 and the prediction image signal from the prediction signal generator 709. Then, the adder 704 adds the reproduction differential signal and the prediction image signal, and generates a local decoded image signal. The local decoded image signal is an image signal obtained by decoding the pixel values of pixels within a processing block unit.

The loop filter processor 705 performs substantially the same operation as the loop filter processor 104 according to the first embodiment. More specifically, the loop filter processor 705 receives the local decoded image signal from the adder 704, and receives the loop filter information from the outside, performs the filter processing on the local decoded image signal based on the loop filter information, and generates a reference image signal.

The displacement amount generator 707 receives the reference image signal from the image buffer 105 and receives the input image data from the outside, and generates an amount of displacement (in this case, motion vector). The method for generating the amount of displacement uses a generally-available method, and therefore, description thereabout is omitted here.

The entropy encoder 710 receives the quantization transformation coefficient information from the transform and quantization unit 702, receives the loop filter information from the loop filter processor 705, and receives the amount of displacement from the displacement amount generator 707. Then, the entropy encoder 710 encodes the quantization transformation coefficient information, the loop filter information, and the amount of displacement, and generates encoded data.

According to the second embodiment explained above, the same processing as that performed by the interpolation filter processor of the video decoding apparatus according to the first embodiment is performed, so that the number of times of multiplication can be reduced in the filter processing, and the encoding processing can be performed with a less amount of operation in whole.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A video decoding method comprising:
   decoding encoded data to obtain a loop filter information item for a decoded image signal which is to be decoded, a vector representing a position of a interpolation pixel, and a reproduction differential signal;
   performing filter processing on the decoded image signal based on the loop filter information item to generate a reference image signal including a pixel value of an integer-pixel;
   generating an interpolation image signal including the pixel values of the integer-pixel and the interpolation pixel, based on,
      if the interpolation pixel obtained from the vector is not located at a integer-pixel position and is not located in a row of the integer-pixel in a horizontal direction or a vertical direction, and the interpolation pixel is located at a first pixel position displaced from the integer-pixel in the horizontal direction by a half pixel and displaced in the vertical direction by a half pixel, applying a first filter to the reference image signal in the vertical direction and the horizontal direction to obtain a pixel value of the interpolation pixel, the first filter being symmetrical,
      and if the interpolation pixel is located at a second pixel position displaced from the integer-pixel in the horizontal direction by a quarter pixel and displaced in the vertical direction by a quarter pixel, applying a second filter to the reference image signal in the horizontal direction and the vertical direction to obtain the pixel value of the interpolation pixel, the second filter being a asymmetrical filter that tap length is shorter than tap length of the first filter,
      and if the interpolation pixel is not located at the first pixel position and the second pixel position, applying the second filter to the reference image signal in a first direction, in which the interpolation pixel is displaced by quarter pixel, and applying the first filter to the reference image signal in a second direction being not the first direction, to obtain the pixel value of the interpolation pixel;
   generating a prediction image signal based on the interpolation image signal; and
   obtaining an output image signal from the prediction image signal and the reproduction differential signal.

2. The method according to claim 1, wherein the generating the interpolation image signal performs a first processing and a second processing on the interpolation pixel of the second pixel, the first processing calculating a first value, by applying the first filter in the first direction if the position of the interpolation pixel in the first direction is a first position that is displaced from the integer-pixel in the first direction by the half pixel, and by applying the second filter is used in the first direction if the position of the interpolation pixel is other than the first position, the second processing calculating the pixel value of the interpolation pixel, by applying the first filter in the second direction using the first value as an input value if the position of the interpolation pixel in the second direction is a second position that is displaced from the integer-pixel in the second direction by the half pixel, and by applying the second filter in the second direction using the first value as an input value if the position of the interpolation pixel is other than the second position.

3. The method according to claim 2, wherein the generating the interpolation image signal performs the second processing using a second value that the first value is converted with a predetermined bit precision by performing round off processing on the first value.

4. The method according to claim 3, wherein if the first filter and the second filter are used to calculate the pixel value of the second pixel, the filter processing using the first filter is performed before the filter processing using the second filter.

5. A video encoding method comprising:
   generating a reference image signal by performing filter processing on a local decoded image signal, based on loop filter information item which is control information item for the filter processing;
   generating a vector representing a pixel position of interpolation pixel based on the reference image signal and an input image signal indicating an image signal given from the outside;
   generating an interpolation image signal including the pixel values of an integer-pixel and the interpolation pixel, based on,
      if the interpolation pixel obtained from the vector is not located at a integer-pixel position and is not located in a row of the integer-pixel in a horizontal direction or a vertical direction, and the interpolation pixel is located at a first pixel position displaced from the integer-pixel in the horizontal direction by a half pixel and displaced in the vertical direction by a half pixel, applying a first filter to the reference image signal in the vertical direction and the horizontal direction to obtain a pixel value of the interpolation pixel, the first filter being symmetrical,
      and if the interpolation pixel is located at a second pixel position displaced from the integer-pixel in the horizontal direction by a quarter pixel and displaced in the vertical direction by a quarter pixel, applying a second filter to the reference image signal in the horizontal direction and the vertical direction to obtain the pixel value of the interpolation pixel, the second filter being a asymmetrical filter that tap length is shorter than tap length of the first filter, and if the interpolation pixel is not located at the first pixel position and the second pixel position, applying the second filter to the reference image signal in a first direction, in which the interpolation pixel is displaced by quarter pixel, and applying the first filter to the reference image signal in a second direction being not the first direction, to obtain the pixel value of the interpolation pixel;

generating a prediction image signal based on the interpolation image signal;

converting and quantizing a differential signal representing a difference between the prediction image signal and the input image signal to generate a quantization transformation coefficient information item; and encoding the quantization transformation coefficient information item, the loop filter information item, and the vector to generate encoded data.

6. The method according to claim 5, wherein the generating the interpolation image signal performs a first processing and a second processing on the interpolation pixel of the second pixel, the first processing calculating a first value, by applying the first filter in the first direction if the position of the interpolation pixel in the first direction is a first position that is displaced from the integer-pixel in the first direction by the half pixel, and by applying the second filter is used in the first direction if the position of the interpolation pixel is other than the first position, the second processing calculating the pixel value of the interpolation pixel, by applying the first filter in the second direction using the first value as an input value if the position of the interpolation pixel in the second direction is a second position that is displaced from the integer-pixel in the second direction by the half pixel, and by applying the second filter in the second direction using the first value as an input value if the position of the interpolation pixel is other than the second position.

7. The method according to claim 6, wherein the generating the interpolation image signal performs the second processing using a second value that the first value is converted with a predetermined bit precision by performing round off processing on the first value.

8. The method according to claim 7, wherein if the first filter and the second filter are used to calculate the pixel value of the second pixel, the filter processing using the first filter is performed before the filter processing using the second filter.

9. A video decoding apparatus comprising:

a decoder configured to decode encoded data to obtain a loop filter information item for a decoded image signal which is to be decoded, a vector representing a position of a interpolation pixel, and a reproduction differential signal;

a first filter processor configured to perform a filter processing on the decoded image signal based on the loop filter information item to generate a reference image signal including a pixel value of an integer-pixel;

a second filter processor configured to generate an interpolation image signal including the pixel values of the integer-pixel and the interpolation pixel, based on, if the interpolation pixel obtained from the vector is not located at a integer-pixel position and is not located in a row of the integer-pixel in a horizontal direction or a vertical direction, and the interpolation pixel is located at a first pixel position displaced from the integer-pixel in the horizontal direction by a half pixel and displaced in the vertical direction by a half pixel, applying a first filter to the reference image signal in the vertical direction and the horizontal direction to obtain a pixel value of the interpolation pixel, the first filter being symmetrical, and if the interpolation pixel is located at a second pixel position displaced from the integer-pixel in the horizontal direction by a quarter pixel and displaced in the vertical direction by a quarter pixel, applying a second filter to the reference image signal in the horizontal direction and the vertical direction to obtain the pixel value of the interpolation pixel, the second filter being a asymmetrical filter that tap length is shorter than tap length of the first filter, and if the interpolation pixel is not located at the first pixel position and the second pixel position, applying the second filter to the reference image signal in a first direction, in which the interpolation pixel is displaced by quarter pixel, and applying the first filter to the reference image signal in a second direction being not the first direction, to obtain the pixel value of the interpolation pixel;

a generator configured to generate a prediction image signal based on the interpolation image signal.

10. The apparatus according to claim 9, wherein the second filter processor performs a first processing and a second processing on the interpolation pixel of the second pixel, the first processing calculating a first value, by applying the first filter in the first direction if the position of the interpolation pixel in the first direction is a first position that is displaced in the first direction by the half pixel, and by applying the second filter is used in the first direction if the position of the interpolation pixel is other than the first position, the second processing calculating the pixel value of the interpolation pixel, by applying the first filter in the second direction using the first value as an input value if the position of the interpolation pixel in the second direction is a second position that is displaced in the second direction by the half pixel, and by applying the second filter in the second direction using the first value as an input value if the position of the interpolation pixel is other than the second position.

11. The apparatus according to claim 10, wherein the second filter processor performs the second processing using a second value that the first value is converted with a predetermined bit precision by performing round off processing on the first value.

12. The apparatus according to claim 11, wherein if the first filter and the second filter are used to calculate the pixel value of the second pixel, the second filter processor performs the filter processing using the first filter before the filter processing using the second filter.

* * * * *